June 21, 1960  R. M. SMOLL  2,941,642
CLUTCH OR BRAKE
Filed Aug. 27, 1957
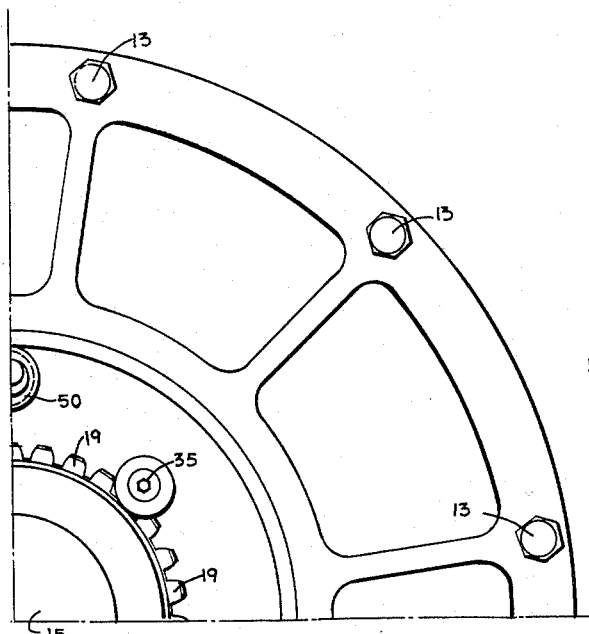
FIG-2
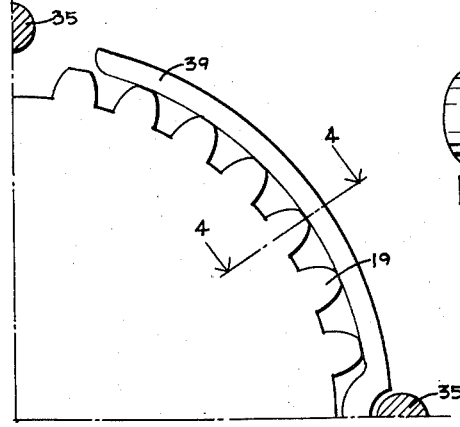
FIG-3
FIG-5
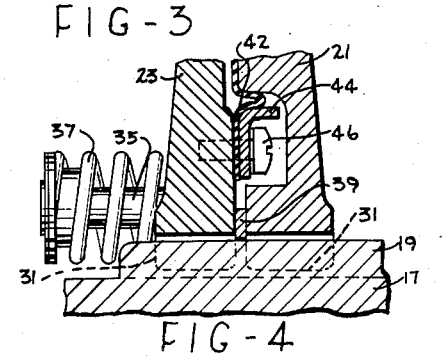
FIG-4
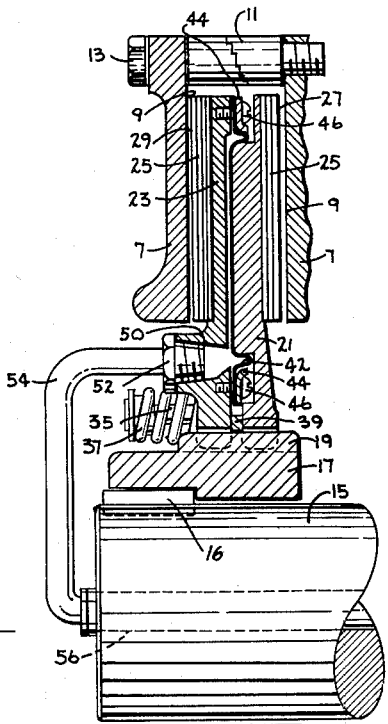
FIG-1
INVENTOR.
R. M. SMOLL
BY
John H. Widdowson
ATTORNEY United States Patent Office 2,941,642
Patented June 21, 1960

2,941,642

CLUTCH OR BRAKE

Richard M. Smoll, 1616 Perry, Wichita, Kans.

Filed Aug. 27, 1957, Ser. No. 680,568

3 Claims. (Cl. 192—88)

This invention relates to clutching or braking. In a more specific aspect this invention relates to new clutch or brake means. In a still more specific aspect this invention relates to means for the transmission of power from a driving to a driven member by frictional force between two or more friction surfaces, or as a friction brake for restraining rotation. In yet a more specific aspect this invention relates to new mounting means for flexible fluid operated clutch or brake mechanism, which functions to transmit power through the use of friction surfaces.

Clutch and brake apparatus have long been known in the art. Some of these clutch and brake mechanisms operate by the movement of friction surfaces. Also, some of these mechanisms utilize a flexible diaphragm to create a chamber for operating fluid to in turn upon introduction of fluid into the chamber force friction surfaces into contact. Difficulty has been encountered with these brake or clutch mechanisms of the prior art, because they do not provide for alignment between the driven or driving member, or they do not provide for operating alignment of parts when used as a brake. Both the driven and driving member of a clutch mechanism usually rotate and are mounted on separate axle means. This is also true in the case of brake mechanisms in most instances. The mounting or axle means can get out of alignment, thus making it impossible for the friction surfaces to contact to transmit the force necessary. Further, the clutch or brake mechanisms of the prior art are too complicated, expensive to build, and difficult to maintain in operation. I have invented new fluid operated clutch or brake mechanism which overcomes the difficulties encountered by those of the prior art. The new clutch or brake mechanism of my invention provides for continual operating alignment between the driven and driving member or between the brake members. Through the unique mounting means of my invention, the frictional surfaces at all times are in perfect operating position. The new brake or clutch mechanism of my invention is easy to manufacture and operate, and inexpensive to manufacture and maintain in use.

The new clutch or brake mechanism of my invention has a first friction member, having a friction surface. A mounting member is used which is rotatable relatively to the first friction member. Cooperating spaced friction members are provided. At least one and preferably both of these members has a friction surface which is frictionally engageable with the friction surface of the first friction member. These spaced friction members are slidably mounted on the mounting member to rotate therewith in operation. Means are mounted in an inner portion of the spaced friction members to resiliently urge the friction surfaces of the clutch or brake out of engagement. A diaphragm is disposed between the spaced friction members, to form with the members a chamber to receive fluid for operating the clutch or brake. When fluid is introduced, the operating friction surfaces are forced into engagement. Means to provide the operating fluid and to introduce same into the chamber is provided.

It is an object of my invention to provide new braking or clutching means.

It is another object of my invention to provide improved fluid operated friction clutching or braking mechanism.

Yet another object of my invention is to provide new mounting means for fluid operated friction clutch or brake mechanism.

Still another object of my invention is to provide new fluid friction clutch or brake mechanism, which is self-aligning so that the driven and driving members are always in alignment. Thus, the operating friction surfaces will always be in desired operating position, or the friction braking surfaces will always be in correct operating position.

Other objects and advantages of the new brake or clutch mechanism of my invention will become apparent to those skilled in the art upon reading this disclosure.

Drawings accompany and are a part of this disclosure. These drawings depict preferred specific embodiments of the new clutch or brake mechanism of my invention. It is to be understood that the drawings are not to unduly limit the scope of my invention.

In the drawings, Fig. 1 is an elevation view partly in cross section through a preferred specific embodiment of the new means of my invention used as a clutch.

Fig. 2 is an end elevation view of the means of Fig. 1 showing a quadrant of same.

Fig. 3 is an enlarged view of a quadrant of the preferred aligning means of the mechanism shown in Figs. 1 and 2.

Fig. 4 is a view taken on line 4—4 of Fig. 3.

Fig. 5 is a perspective view of the preferred adjustable spacing means shown in Fig. 1. This is an enlarged view.

Following is a discussion and description of the new clutch or brake means of my invention made with reference to the drawings. The same reference numerals are used on the drawings to indicate the same or similar parts or structure. The discussion and description is of preferred specific embodiments of the new clutch or brake means of my invention, and it is to be understood that such is not to unduly limit the scope of my invention.

In Fig. 1 of the drawings the preferred clutch mechanism of my invention is shown in out of engagement position, that is, with the friction surfaces not in contact. A first pair of plates 7 are provided. These plates 7 are connected as desired to other operating means (not shown). These plates have inner annular friction surfaces 9, which are arranged in spaced confronting relation. A plurality of adjustable spacer members 11 around the outer portions of plates 7 secure the plates in assembled relation. Bolts 13 pass through holes in plates 7 and mount spacers 11. Spacers 11 are shown in enlarged detail in Fig. 5. These spacers 11 are made in two parts, and the parts interlock and are mirror images. Four spacings can be accomplished with the parts shown. Any number of spacers 11 can be used as desired, and to adjust the spacing between plates 7, the parts of the spacers 11 are turned relative to each other on bolts 13 to a position which gives the desired spacing.

Annular plates 7 are mounted coaxial to shaft 15, which is the mounting means for the clutch assembly. The rotational force is exerted by or on this shaft 15. A collar member 17, having splines 19 thereon, is suitably mounted on shaft 15 to turn therewith in operation. The mounting of collar member 17 on shaft 15 can suitably be by any of the common means therefor, such as heat sweating it thereon, or by using a key or set screw. Key 16 is a keyway formed in shaft 15 and collar 17 has been found suitable.

A second pair of friction plates is used, namely plate 21 and plate 23. The outside of plates 21 and 23 are built up with suitable friction exerting material 25 to provide annular frictional surfaces 27 and 29 on plates 21 and 23, respectively. In operation these annular friction surfaces 27 and 29 engage annular frictional surfaces 9 on confronting plates 7. Friction plates 21 and 23 extend into the space between plates 7 a sufficient amount to give the desired contact between the friction surfaces 9 and 27 and 29. The inner portions of plates 21 and 23 have teeth 31 which fit into splines 19 of collar 17. This type of mounting has been found to be very desirable, since alignment is always maintained between the friction plates 7 and 21 and 23 no matter the position of shaft 15 and the means to which plates 7 are connected. With this mounting means plates 21 and 23 can move back and forth in splines 19 as required or desired. Of course, plates 21 and 23 being slidably mounted on collar 17 move back and forth in operation to engage friction surfaces 9 and 27 and 29.

A plurality of bolts 35 pass through apertures in plate 23 and are threadedly secured to plate 21. These bolts 35 mount helical springs 37 which are in compression and which urge plates 21 and 23 together to disengage the frictional surfaces 9 and 27 and 29. In clutch operation plates 21 and 23 are apart, and when out of operation, these plates are maintained close relatively by springs 37. In order to provide for plates 21 and 23 to come back to desired central position, a split ring positioning member 39 is mounted around hub 17 on splines 19. Enough spring tension is maintained on split ring 39 to keep it normally in set position on hub 17. This insures disengagement of friction surfaces 9 from friction surfaces 27 and 29. Split ring 39 snugly engages splines 19 under spring tension. Any substantial force on plates 21 and 23 will slide ring 39 to a new position. This can occur during the self-alignment between plates 7 and shaft 15 during operation.

An annular diaphragm 42 of resilient material is mounted on plate 23 and between the plates 21 and 23. This diaphragm can conveniently be made of rubber or rubber like material. It is preferably held in position on plate 23 by clamps 44 and bolts 46 which are threadedly secured to plate 23. Thus, diaphragm 42 forms a chamber with plate 23. When fluid under pressure is introduced into this chamber, diaphragm 42 extends and forces plates 21 and 23 apart. This brings friction surfaces 27 and 29 into contact with friction surfaces 9. Plates 7 then turn with shaft 15 and collar 17 mounted thereon. Plate 23 is provided with an aperture 50. A connector 52 threadedly mounts flexible hose or pipe 54 in aperture 50. The other end of flexible hose 54 is suitably mounted in the outer end of a conduit 56 through shaft 15. In operation, fluid which can either be a gas or a liquid, is passed through conduit 56, hose 54 and aperture 50 into the chamber formed by diaphragm 42 and plate 23. Any suitable means can be used to force the operating fluid through these conduits into the chamber.

The new clutch or brake mechanism of my invention has proven successful in operation. It is very adaptable to any and all types of operation, giving no difficulty and requiring the minimum of attention and maintenance. To a great extent this results from the self-aligning and self-centering features of the new clutch or brake mechanism. The difficultly movable, self-centering, split ring type spacer 39 for plates 21 and 23 provides for complete separation of clutch frictional surfaces upon release of operating fluid, that is, with spacer 39 both plates 21 and 23 will disengage from plates 7 under the force and urging of spring 37 upon release of operating fluid. This overcomes the difficulty that without spacer 39 one of plates 21 and 23 will remain engaged with plates 7. It has been found that split ring 39 will move in relation to hub 17 upon wear of the clutch or brake shoes which always occurs. With my new apparatus or mechanism, no alignment problems are encountered due to such wear.

As will be evident to those skilled in the art, various modifications of the invention can be made or followed in the light of this disclosure, without departing from the spirit of the disclosure or from the scope of the claims.

I claim:

1. Apparatus of the described character, comprising, in combination: a first pair of plates having annular friction surfaces arranged in spaced confronting relation; a plurality of adjustable and self contained spacer members and mounting means therefor spaced around the outer portions of said plates and securing said plates in assembled relation; a power transmitting and mounting shaft coaxially arranged with said friction surfaces of said plates to operate therewith in transmitting power, said shaft having a splined collar member mounted thereon to turn therewith; a second pair of plates having annular friction surfaces on the outer sides thereof arranged in side by side relation upon said collar member, the outer portions of said second pair of plates extending into the space between said first pair of plates, said second pair of plates being toothed in the inner portions with the teeth thereof slidably mounted in the splines of said splined collar member to turn said second pair of plates with said collar member and shaft, and said second pair of plates being movable in operation to engage said friction surfaces of said pairs of plates; a plurality of spaced spring loaded means in an inner annular region of said second pair of plates outwardly of said teeth, said means urging said plates together and out of engagement; a split ring mounted around said collar member and only in frictional slidable engagement therewith between said second pair of plates and movable longitudinally of said collar member and limiting travel of said second pair of plates; a diaphragm disposed in the space between said second pair of plates, said diaphragm having the outer marginal portion secured to the outer marginal portion of one of said second pair of plates and the inner marginal portion of said diaphragm secured to the same plate in an inner annular region outwardly of said region of said spring loaded means, thereby forming a chamber between said diaphragm and last-named plate to receive operating fluid under pressure to force said second pair of plates apart and into engaging relation with said first pair of plates; and means for introducing operating fluid under pressure into said chamber.

2. Apparatus of the described character, comprising, in combination: a first pair of plate type members having friction surfaces adjustably arranged in spaced confronting relation; a mounting shaft concentric with said friction surfaces, said shaft having an external splined portion; a second pair of plate type members having friction surfaces on the outer sides thereof in side by side relation, said second pair of plate members having teeth in the inner portion slidably mounted in the splines on said shaft to turn with said shaft and the outer portions of said second pair of plate members extending into the space between said first pair of plate members to in operation engage said friction surfaces of said pairs of plate members; resilient means in an inner portion of said second pair of plate members urging said plate members out of engagement; ring means mounted solely by friction around said splined portion of said shaft between said second pair of plate members and in slidable engagement therewith, said ring means operatively moveable longitudinally of said shaft and limiting said travel of said second pair of plate members upon said resilient means moving said second pair of plate members; a diaphragm disposed in the space between said second pair of plate members, said diaphragm mounted on one of the plates of said second pair of plate members to form a chamber between said second pair of plate members to receive operating fluid under pressure to force said second pair of plate members apart and engage said friction surfaces of said pairs of plate members; and means for introducing operating fluid under pressure into said chamber.

3. Apparatus of the character described, comprising, in combination: a first pair of friction members having friction surfaces adjustably spaced; means with said friction members to adjustably space same; a mounting shaft rotatable relative to said first friction surfaces; a second pair of spaced friction members, said second pair of friction members having friction surfaces frictionally engageable with said friction surfaces of said first pair of friction members and each one of said second pair of friction members slidably mounted on said mounting shaft and to rotate therewith; means mounted in an inner portion of said second pair of spaced friction members resiliently urging said friction surfaces out of engagement; a diaphragm operatively mounted and disposed between said second pair of spaced friction members to form therewith a chamber to receive operating fluid to force said friction surfaces of said pairs of friction members into engagement; means for introducing operating fluid into said chamber; and means directly mounted on said rotatable shaft and adjustable longitudinally thereof and between said second pair of friction members, said adjustable means constructed to in operation limit movement of said second pair of friction members relative to said mounting shaft upon disengagement of said friction surfaces of said first and second pairs of friction members and movement of said second pair of friction members under the urging of said means resiliently urging said friction surfaces out of engagement.

References Cited in the file of this patent

UNITED STATES PATENTS

| | | |
|---|---|---|
| 2,163,033 | Gosling | June 20, 1939 |
| 2,174,316 | Dunkelow | Sept. 26, 1939 |
| 2,273,345 | Burrell | Feb. 17, 1942 |
| 2,370,360 | McLean | Feb. 27, 1945 |
| 2,386,478 | Kraft | Oct. 9, 1945 |
| 2,422,159 | Wood | June 10, 1947 |
| 2,747,711 | Schmitter | May 29, 1956 |
| 2,765,061 | Fawick | Oct. 2, 1956 |